United States Patent Office 3,132,965
Patented May 12, 1964

3,132,965
PRINTING PASTES, PADDING LIQUORS AND PIGMENT DYEING PROCESS
Helmut Schmidt, Johann Wolfgang Zimmermann, and Kurt Stetzelberg, all of Frankfurt am Main, Germany, assignors to Farbwerke Hoechst Aktiengesellschaft vormals Meister Lucius & Brüning, Frankfurt am Main, Germany, a corporation of Germany
No Drawing. Filed Dec. 16, 1960, Ser. No. 76,102
Claims priority, application Germany Dec. 19, 1959
12 Claims. (Cl. 117—38)

The present invention relates to the fixation of pigments to fibrous materials and two-dimensional structures. It is already known to prepare pigment prints by utilizing, for the fixation of pigments, binding agents containing polyvinyl alcohol. For these processes there are used:

(a) Combinations of polyvinyl alcohol or the water-soluble derivatives and aldehydes thereof or compounds splitting off such aldehydes, (b) Condensation products of polyvinyl alcohol and compounds containing in the molecule at least 2 methylol groups, (c) Mixtures of polyvinyl alcohol and condensation products of ureas and formaldehyde, if desired in the presence of an excess of formaldehyde and (d) Mixtures of polyvinyl alcohol and polymethylol compounds, for example tetramethylol-acetylene diurea.

The hardening of the binding systems cited above is carried out in the presence of potentially acid compounds by dry heating to temperatures above 100° C.

The present invention is based on the observation that especially valuable pigment prints and pigment dyeings are obtained by utilizing printing pastes or padding liquors containing as binding agent a combination of partially or completely etherified aminoplast-precondensates and partially or completely saponified graft polymers of vinyl esters on polyethylene glycol. The fixation of the prints and dyeings is carried out in the presence of potentially acid hardening agents, for example ammonium nitrate, diammonium phosphate, ammonium oxalate, ammonium acetate, ammonium fluoride, ammonium thiocyanate, tartaric acid diethyl ester, ammonium chloride and the like. The fixation may be carried out either by a neutral or an acid steaming process within 5 to 10 minutes at temperatures between about 90° and 120° C., or by dry heating at elevated temperatures, preferably within approximately ½ to 10 minutes above 100° C., at temperatures up to about 200° C., depending on the material to be colored.

The mixing proportion of the two components constituting the combination of binding agents used according to the invention may vary within wide limits. The two components are used preferably in a proportion such that per 1 part by weight of the saponified graft polymer about 0.5 to about 1.8 parts by weight of the etherified aminoplast precondensates are used. The quantities of the combination of binding agents to be added to the printing pastes or padding liquors depend on the given proportions, for example on the operational conditions when dyeing or printing, on the articles to be dyed or printed etc. It is, therefore, impossible to give generally valid data, particularly as to the content of binding agents according to the invention in the printing pastes or padding liquors. The quantity of acid hardening agents to be additionally used equally depends on numerous factors, for example on the kind of hardening agent used, on the quantity of binding agents to be used and others. In general, the potential hardening agents mentioned above are used in quantities of from about 0.5 to about 1.5% by weight, calculated on the weight of the printing pastes or padding liquors. The printing pastes or padding liquors are applied to the material to be treated, according to known working methods for usual printing or dyeing processes, preferably by film or roller printing or by padding.

As partially or completely etherified aminoplast precondensates there are especially used such of 1 mol urea and 1 to 4 mols formaldehyde or of 1 mol melamine and 1 to 6 mols formaldehyde, for example mono-, di- and trimethylol-urea, mono-, di-, penta- and hexamethylol-melamine, the methylol radicals of which are partially or completely etherified with alcohols of low molecular weight. In this case, at least one methylol group of the precondensates should be etherified. Mixtures of the etherified aminoplast formers mentioned may also be used. For the etherification there are used mono- or bifunctional aliphatic alcohols of low molecular weight containing 1 to 4 carbon atoms, for example methanol, ethanol, propanol, butanol, ethylene glycol and butane-diol-1,4 or mixtures of these alcohols.

By partially or completely saponified graft polymers of vinyl esters on polyalkylene glycol, there should be understood, water-soluble graft polymers with K-values of from about 15 to about 120 (according to Fikentscher, Cellulosechemie, vol. 13, page 58 (1932)), in which, by alcoholysis, the vinyl ester units are partially or completely converted into vinyl alcohol units. Such products are described for example in U.S. patent applications Ser. Nos. 815,797, filed May 26, 1959, and 38,461, filed June 24, 1960.

The graft polymers may be obtained by radical-initiated polymerization of vinyl esters of saturated carboxylic acids containing 1 to 4 carbon atoms, for example vinyl acetate, in the presence of polyalkylene glycols as trunk polymer with molecular weights ranging from about 400 to 1,500,000, preferably from about 1,000 to 500,000, for example polyethylene glycols, polypropylene glycols or also hydroxyethylated polypropylene glycols as well as higher homologs of polypropylene glycol in a homogeneous phase and by subsequently saponifying the vinyl ester component of the graft polymer partially or completely. The saponification of the vinyl ester groups may be carried out according to known processes, in any desired manner, partially or completely, preferably from 20 to 100% by weight of the ester units contained in the original graft polymers.

This process is usually carried out batchwise or continuously in the presence of solvents or mixtures of solvents, for example methanol or methanol/methylacetate, if desired, in an inert gas atmosphere, for example under nitrogen. When the saponification is carried out in an alkaline medium, sodium hydroxide or potassium hydroxide for example which is dissolved in methanol is used as a catalyst. It is generally sufficient to add the alkali in a catalytic proportion. Greater quantities, for example molar quantities, of alkali, however, may also be added. Saponification may be carried out at room temperature or even at elevated temperatures, for example at the boiling temperatures of the solvent or of the mixture of the solvents used. The saponification in the presence of acid is carried out, for example, with the usual mineral acids, for example sulfuric acid or hydrochloric acid and, usually, at the boiling temperature of the solvent. It is also possible to saponify at lower temperatures. The amounts of polyalkylene glycols originally contained in bound form in the starting graft polymer are completely retained in the saponification product.

In the graft polymers used according to the invention, preferably such of vinyl acetate on polyethylene glycol, the content of vinyl alcohol, i.e. the content of the units

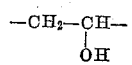

in the macromolecule should range from 40 to 80% by weight. By these substances there may be understood internally plastified polyvinyl alcohols which, when the process is carried out as described above, act as binding agents, and simultaneously as plasticizers, protective colloids and dispersing or emulsifying agents. On account of these properties of the polymers it is unnecessary to add in the process of this invention the usual plasticizers and relatively high quantities of dispersing and emulsifying agents, which were necessary in the known processes of pigment printing using the above-mentioned binding agents. The plasticizers which have usually been necessary in the known processes are disadvantageous especially as to the fastness of the dyeings to rubbing and wetting.

Due to the above-mentioned good properties of the new binding agents the process of the present invention yields prints and dyeings distinguished by unexpectedly brilliant tints, a good yield of color and a sharp print, a very soft handle of the goods and a very good fastness to wet.

A further advantage of the binding agents according to the present invention is the extraordinarily high fastness to electrolytes of the printing pastes prepared with these binding agents. It is especially advantageous to use additionally to the pigment dyestuffs other dyestuffs, for example vat dyestuffs, stabilized color salts or reactive dyestuffs in the preparation of which greater quantities of electrolytes are used.

As thickening agent for the preparation of printing pastes, oil-in-water emulsions, preferably such based on water-insoluble benzene-hydrocarbons boiling at temperatures between about 130° and about 300° C. may be added in the desired proportions to the mixtures according to the present invention.

Besides the components mentioned, there may additionally be used natural resins or artificial resins, for example such on the basis of butadiene, acrylonitrile, styrene, acryl ester, vinyl ester, arylamide, vinyl chloride, vinylidine chloride or copolymers from the monomers mentioned as well as polyvinyl acetates and oil-soluble aminoplasts and alkyd resins.

According to the intended use of the material to be colored it may be advantageous to add to the printing pastes or padding liquors compounds imparting to the fabrics especially desired properties, such as the known finishing agents or agents for rendering the fabrics water-repellent.

As pigments the known inorganic and organic pigments may be used. The following pigments are mentioned by way of example: carbon black, metal powder, titanium dioxide, iron oxyhydrates, ultramarine blue and other oxidic or sulfidic inorganic pigments, furthermore, organic pigments, for example azo pigments, vat dyestuffs, phthalocyanine dyestuffs, bisoxacine dyestuffs, perylene tetracarboxylic acid dyestuffs and quinacridone dyestuffs, as mentioned in U.S. Patents Nos. 2,844,484, 2,844,581 and 2,844,485.

Under the term of azo pigments are to be understood azo pigments which are obtained by coupling diazo or tetrazo compounds of amines having no groups imparting water-solubility, with the coupling components conventially used in pigment chemistry. As coupling components there are used, for example: naphthols, hydroxynaphthoic acid arylides, pyrazolones, acetoacetic acid arylides and others. In case these dyestuffs contain sulfonic acid or carboxylic acid groups, they can be used in the form of color lakes prepared with salts of the alkaline-earth metals.

As material to be printed or dyed there should be mentioned fibres and flat structures, for example woven fabrics, knitted or plaited fabrics and others made of natural or regenerated cellulose, for example cotton, staple fibre, rayon, furthermore, such made of fully synthetic material, for example polyamides, polyolefins, polyacrylonitrile or polyesters, especially polyethylene glycol terephthalates, as well as glass, paper and foils.

The following examples serve to illustrate the invention but they are not intended to limit it thereto, the parts being by weight unless otherwise stated:

*Example 1*

A cotton fabric is printed with a painting paste prepared from:

50 parts of a 32% aqueous dispersion of copper phthalocyanine,
200 parts of a 30% aqueous solution of a partially saponified graft polymer obtained according to U.S. Patent application Ser. No. 38,461 consisting of 26% polyethylene glycol, 26% vinyl acetate and 48% vinyl alcohol units in the macromolecule, K-value=45,
80 parts of a 80% aqueous dispersion of dimethylol urea, etherified per 1 mol pre-condensate with 1 mol methanol and 1 mol butanediol-1,4,
650 parts of an oil-in-water emulsion having the composition given hereunder and
20 parts of a 33% aqueous solution of diammonium phosphate 1000 parts The oil-in-water emulsion is obtained by emulsifying into a solution prepared from:

3 parts of the reaction product of 13 mols ethylene oxide with 1 mol tri-isobutylphenol in
147 parts of water
850 parts of heavy petrol boiling at temperatures between 180° and 230° C.

1000 parts

Subsequently, the print is fixed for 5 minutes by dry heating to 150° C. A brilliant blue print having good fastness properties is obtained.

*Example 2*

A fabric of staple fibre is printed with a printing paste prepared from:

50 parts of a 42.5% aqueous dispersion of 5,5'-dichloro-7,7'-dimethyl-thio-indigo,
150 parts of a 30% aqueous solution of the above-mentioned partially saponified graft polymer,
60 parts of an about 50% aqueous solution of hexamethylol-melaminetetramethyl ether,
720 parts of the oil-in-water emulsion cited above,
20 parts of a 50% aqueous solution of ammonium nitrate 1000 parts The fixation is carried out by dry heating for 5 minutes at 140° C. The brillant red violet print obtained is distinguished by a very soft handle and by very good fastness properties.

*Example 3*

50 parts of a 38% aqueous dispersion of the coupling product of 2 mols, 2,5-dimethoxy-4-chloroacetoacetic acid anilide with 1 mol 2,2'-dichlorobenzidine,
180 parts of a 30% aqueous solution of a saponified graft polymer with a K-value of 45, obtained according to U.S. patent application Ser. No. 815,797 consisting of 30% polyethylene glycol and 70% vinyl alcohol units in the macromolecule,
60 parts of an about 80% aqueous solution of a dimethylol urea etherified with 1 mol methanol and 1 mol butanediol-1,4,
690 parts of the oil-in-water emulsion cited in Example 1,
20 parts of a 50% aqueous solution of ammonium nitrate 1000 parts This printing paste is printed on staple fiber, the print is dried at 80° C. and heated for 5 minutes at 140° C. A clear yellow print having good fastness properties is obtained.

*Example 4*

- 50 parts of a 30% aqueous dispersion of the bisoxacine dyestuff obtained by condensing 2 mols N-ethyl-3-aminocarbazole with 1 mol chloranil,
- 200 parts of a 30% aqueous solution of the saponified graft polymers cited in Example 3,
- 50 parts of a 50% solution of pentamethylol-melamine-tetrabutyl ether in N-butanol,
- 50 parts of an about 50% aqueous solution of hexamethylol-melaminetetramethyl ether partially etherified with methanol,
- 630 parts of the oil-in-water emulsion cited in Example 1,
- 20 parts of a 30% aqueous solution of diammonium phosphate 1000 parts This printing paste is printed on cotton, the print is dried at 80° C. and heated for 5 minutes at 150° C. A brilliant blue-violet print having good fastness properties is obtained.

*Example 5*

A cotton fabric is printed with a printing paste prepared from:

- 100 parts of a 30% aqueous dispersion of lamp black (soot),
- 200 parts of a 30% aqueous solution of a partially saponified graft polymer obtained according to U.S. patent application Ser. No. 38,461 consisting of 32% polyethylene glycol, 43% vinyl alcohol and 25% vinylacetate units in the macromolecule,
- 100 parts of 65% aqueous solution of an etherification product of 1 mol hexamethylol-melamine and 4 mols ethylene glycol,
- 50 parts of a 26% dispersion of a copolymer of acrylic acid butyl ester/vinyl chloride (65:35),
- 520 parts of the oil-in-water emulsion cited in Example 1,
- 30 parts of a 30% aqueous solution of diammonium phosphate 1000 parts After drying at 80° C. the print is fixed by dry heating for 5 minutes at 150° C. A black print having good fastness properties is obtained.

We claim:

1. Aqueous printing pastes and padding liquors containing (A) pigments and as pigment binding agents, (B) saponified graft polymers of vinylesters of carboxylic acids with 1 to 4 carbon atoms on polyalkylene glycol with a molecular weight of 400 to 1,500,000 and having from 2 to 4 carbon atoms in the alkylene units, the vinyl ester groups of the graft polymers being saponified in an amount of from 20 to 100% calculated on the weight of the ester groups contained in the graft polymers, and (C) etherified aminoplast precondensates selected from the group consisting of precondensates of 1 mol urea and 1 to 4 mols formaldehyde and precondensates of 1 mol melamine with 1 to 6 mols formaldehyde which methylol groups of the precondensates are etherified with 1 to 4 mols alcohol containing 1 to 4 carbon atoms, and as hardening agent (D) potentially acid compounds.

2. Printing pastes and padding liquors as claimed in claim 1 wherein the saponified graft polymers used as component B contain 40 to 80% by weight of vinyl alcohol units.

3. Printing pastes and padding liquors as claimed in claim 1 wherein saponified graft polymers of vinyl acetate on polyethylene glycol are used as component B.

4. Printing pastes and padding liquors as claimed in claim 1 wherein the mixture of components B and C used as pigment binding agents consists of one part by weight of component B and from 0.5 up to 1.8 part by weight of component C.

5. Printing pastes and padding liquors as claimed in claim 1 wherein oil-in-water emulsions are admixed as further component E.

6. A pigment dyeing process wherein there are applied to the materials to be colored aqueous dyeing mixtures which contain (A) pigments, as pigment binding agents, (B) saponified graft polymers of vinylesters of carboxylic acids with 1 to 4 carbon atoms on polyalkylene glycol with a molecular weight of 400 to 1,500,000 and having from 2 to 4 carbon atoms in the alkylene units, the vinyl ester group of the graft polymers being saponified in an amount of from 20 to 100% calculated on the weight of the ester groups contained in the graft polymers, and (C) etherified aminoplast precondensates selected from the group consisting of precondensates of 1 mol urea and 1 to 4 mols formaldehyde and precondensates of 1 mol melamine with 1 to 6 mols formaldehyde which methylol groups of the precondensates are etherified with 1 to 4 mols alcohol containing 1 to 4 carbon atoms, and as hardening agent (D) potentially acid compounds, and wherein the treated material is heated to a temperature of between 90° and 200° C.

7. The pigment dyeing process as claimed in claim 6 wherein the saponified graft polymers used as component B contain 40 to 80% by weight of vinyl alcohol units.

8. The pigment dyeing process as claimed in claim 6 wherein saponified graft polymers of vinyl acetate on polyethylene glycol are used as component B.

9. The pigment dyeing process as claimed in claim 6 wherein the mixture of components B and C used as pigment binding agents consists of one part by weight of component B and from 0.5 up to 1.8 parts by weight of component C.

10. The pigment dyeing process as claimed in claim 6 wherein oil-in-water emulsions are admixed as further component E.

11. The pigment dyeing process as claimed in claim 6 wherein the heat treatment is carried out by steaming at temperatures between 90° and 120° C.

12. The pigment dyeing process as claimed in claim 6 wherein the heat treatment is carried out by dry heating at temperatures between 100° and 200° C.

References Cited in the file of this patent

UNITED STATES PATENTS

| | | |
|---|---|---|
| 2,566,244 | Pinkney | Aug. 28, 1951 |
| 2,961,349 | Bartl | Nov. 22, 1960 |